United States Patent [19]

Harrah et al.

[11] Patent Number: 5,089,063
[45] Date of Patent: Feb. 18, 1992

[54] METHOD FOR PROVIDING ADHESION TO A METAL SURFACE

[75] Inventors: Larry A. Harrah; Ronald E. Allred; Kennard V. Wilson, Jr., all of Albuquerque, N. Mex.

[73] Assignee: PDA Engineering, Inc., Costa Mesa, Calif.

[21] Appl. No.: 461,922

[22] Filed: Jan. 8, 1990

[51] Int. Cl.$^5$ .............. B05D 3/00; C23C 8/06; C23C 22/00
[52] U.S. Cl. .................... 148/241; 148/243; 148/283; 427/054.1; 427/226; 427/327
[58] Field of Search .............. 148/240, 241, 243, 274, 148/276, 283, 284; 427/54.1, 226, 299, 327, 331, 333, 402, 409

[56] References Cited

U.S. PATENT DOCUMENTS

| | | | |
|---|---|---|---|
| 3,592,700 | 7/1971 | Toy | 148/823 |
| 3,616,199 | 10/1971 | Breslow | 525/169 |
| 3,666,536 | 5/1972 | Olsen | 428/457 |
| 3,686,231 | 8/1972 | Haynes | 552/7 |
| 3,697,551 | 10/1972 | Thompson | 552/4 |
| 3,705,911 | 12/1972 | Thomson | 552/4 |
| 3,706,592 | 12/1972 | Thompson | 428/251 |
| 3,715,371 | 2/1973 | Thompson | 534/558 |
| 3,813,351 | 5/1974 | Thompson | 523/414 |
| 3,814,657 | 6/1974 | Haynes | 428/446 |
| 3,914,262 | 10/1975 | Haynes | 552/7 |
| 3,945,830 | 3/1976 | Yazawa et al. | 101/450.1 |
| 3,946,051 | 3/1976 | Haynes | 156/326 |
| 3,997,571 | 12/1976 | Buckley et al. | 552/5 |
| 4,055,701 | 10/1977 | Marsden et al. | 428/391 |
| 4,099,910 | 7/1978 | Herweh | 8/115.64 |
| 4,309,453 | 1/1982 | Reiner et al. | 427/54.1 |
| 4,722,859 | 2/1988 | Kudo et al. | 427/128 |

OTHER PUBLICATIONS

"Applications of Azidosilane Coupling Agents in Reinforced Thermoplastic Composites" by Frances J. Kolpac, SAMPE Quarterly, vol. 18, No. 1, Oct. 1986, pp. 22-28.

"Aryl and Heteroaryl Azides and Nitrenes" by Peter A. S. Smith *Azides and Nitrenes, Reactivity and Utility*, 1984.

*Primary Examiner*—Jay H. Woo
*Assistant Examiner*—James P. Mackey
*Attorney, Agent, or Firm*—Deborah A. Peacock; William A. Eklund

[57] ABSTRACT

A process for treating metal surfaces to obtain improved susceptibility to bonding with adhesive compositions is disclosed. A metal surface is oxidized with a halogen to form a monolayer of halide ions on the surface. The halide ions are then exchanged with azide ions to form an azide monolayer on the metal surface. Upon contact of the treated surface with an adhesive composition, the azide layer may be thermally or photochemically decomposed to form active nitrene species, which react to bond the adhesive composition to the metal surface.

29 Claims, No Drawings

METHOD FOR PROVIDING ADHESION TO A METAL SURFACE

This invention was made with Government support under Contract No. DE-AC03-86ER80412 awarded by the Department of Energy. The Government has certain rights in this invention.

BACKGROUND OF THE INVENTION

1. Field of the Invention (Technical Field)

The invention described and claimed herein is generally related to methods for improving the adhesion of metals to adhesives, resins, coatings, primers, paints, bonding agents, coupling agents, and other similar adhesive compositions.

More particularly, the present invention is related to methods and compositions which enhance the capability of thermoplastic and thermosetting resins to adhere to metal substrates.

2. Description of the Related Art Including Information Disclosed under 37 C.F.R. §§1.97.1.99 (Background Art)

Compositions in the nature of adhesives, paints, primers, coatings, bonding agents, coupling agents and the like, are referred to collectively herein as adhesive compositions. It should be understood that, as used herein, the terms "adhesive composition," "adhesive," "adhesive resin," and "resin" are used broadly, referring not only to conventional adhesives used to bond one article to another, but also referring to paints, coatings, primers, bonding agents, coupling agents, and other compositions which are applied to a solid substrate in a liquid or plastic state, and which are subsequently cured or solidified, either partially or wholly, so as to adhere to the substrate.

It will also be understood that any reference herein to a cured adhesive composition, or a hardened or a solidified adhesive composition, is a reference to the adhesive composition in its final state, even though in some cases the adhesive composition in its final state may in fact be only partially hardened or solidified, as for example In an adhesive composition that in its final state is a plastic or elastomeric material.

The adhesive compositions referred to above all depend for their successful application on the formation of a sufficiently strong bond between the adhesive composition and the solid substrate to which it is applied. It has been a continuing effort in this field of art to find ways to improve the strength and consistency of the bond between adhesive compositions and solid substrates. One conventional way to maximize the strength of such bonds is to prepare or treat the surface of the substrate so as to be more receptive to adhesive bonding. Common methods for mechanically treating solid metal surfaces to enhance bonding include cleaning, etching, and roughening the surface of the metal substrate prior to application of the adhesive composition. In the case of copper-clad circuit boards, there has even been resort to growing small crystalline copper dendrites on the surface of the copper to mechanically enhance the bonding thereto of thermosetting resins.

The other primary approach to strengthening such bonds is to resort to adhesive compositions which form chemical bonds between the metal substrate and the adjacent adhesive composition. This has been a more difficult problem because many metal substrates are relatively inert and do not readily react to form chemical bonds with common adhesive compositions. Also, thermoplastic adhesive compositions typically do not undergo any chemical reaction upon hardening by cooling, and thus do not form chemical bonds with a substrate. Some of the thermosetting adhesive compositions, which cure by chemical polymerization reactions, might be candidates for forming chemical bonds by reacting with a substrate, but the polymerization reactions which result in curing of these adhesive compositions are typically not reactions which will cause bonding of the adhesive composition to a solid substrate, particularly a metal. Accordingly, the present invention is addressed to providing compositions and methods which result in chemical bonding between a metal substrate and a conventional adhesive composition.

In some of the applications discussed below the substrate is a solid metal article to which a bulk adhesive or an adhesive coating is to be adhered. However, it will be seen that there is also contemplated herein the application of the present invention to the bonding of metal planal elements, such as sheet, cast, sintered, electroplated, or electroformed surfaces, fibers, wires, metal foils, micro-spheres, or metal particulate or powder components, alone or in a polymeric or resinous matrix, for the purpose of making high-strength reinforced composite materials.

By way of background, adhesives may be characterized by their solidification process. For example, solvent loss adhesives set, or harden, by loss of solvent through evaporation or by dispersion into a surrounding solid substrate to which a mechanical bond is formed.

Hot melt, or thermoplastic, adhesives form a bond when a thermoplastic material is heated above its softening point and is allowed to cool while in contact with a substrate surface. Examples include polyvinyl acetate, polystyrene, polyamides, acrylics, polyethylene, and ethylvinyl acetate.

Chemical reaction adhesive compositions utilize thermosetting synthetic organic materials. These adhesive compositions are caused to polymerize by the introduction of a chemical reactant or a catalyst, or by heating, or by exposure to air. These adhesives are often characterized by high structural strength but do not always bond well to solid substrates, for the reasons mentioned above. Examples include the epoxy resins, polyurethane resins, phenolics, amino resins, polyesters, and isocyanates.

The adhesive bonding of metal-polymer interfaces is becoming increasingly important in manufacturing. Mechanical fasteners are difficult to configure and expensive to apply in many cases. Adhesive bonding is often the preferred method for the manufacture of complex, multi-component structural shapes and has the additional advantage over mechanical fastening in that it can be applied over large areas of contact and thus avoid stress concentration near mechanical fastening points. However, many metals are by their very nature relatively inert and/or stable materials to which it is difficult to form strong adhesive bonds. Most adhesives in use today depend on relatively weak physical forces to achieve adherence to the substrate on which they are used. If a covalent chemical bond can be formed between the surfaces to be bonded, adhesion between the adherends can be greatly enhanced over any physical interaction. Modern adhesives attempt to utilize this covalent chemical bonding to effect a strong bond. The principal problem arising in these attempts is that the adhesive must be carefully tailored to each application or the substrates must undergo special surface treatment to allow their participation in the bonding process. In many cases, both adhesive tailoring and surface treatment are needed to effect the bond.

As will be discussed below, the present invention is based upon the use of certain azides, which can be thermally or photochemically decomposed to nitrenes. (Nitrenes are sometimes referred to in the older literature as azenes, imenes, azylenes or imidogens.) Nitrenes in turn react to form strong covalent bonds with many compounds, including ordinarily inert metal substrates as well as with most organic resins. Azides have been previously used in photoresist applications to render polymer coatings insoluble after exposure to ultraviolet and visible light. This photocrosslinking technique has been applied to photoresist formulations for patterning metals and semiconductors.

It has been previously known to use nitrenes to modify surfaces. For example, U.S. Pat. No. 3,666,536 to Olsen, et al., discloses the process of generating gaseous nitrene species by pyrolytic decomposition of certain nitrogeous precursors, followed by exposing the gaseous nitrenes to a solid material to thereby effect modification of the surface characteristics of the solid material.

It has also been previously known to use azidosilanes as coupling agents in filled polymers. For example, the use of azidosilanes for this purpose is disclosed in the paper by F. J. Kolpak, Applications of Azidosilane Coupling Agents in Reinforced Thermoplastic Composites, SAMPE Quarterly, Vol. 18, No. 1, October 1986, pp 21-27. The method Kolpak is however not suitable in the present invention because the azidosilanes are hydrolytically unstable and react with water to form the free amine and the corresponding sulfonic acids. As another example, U.S. Pat. No. 4,055,701 to Marsden, et al., discloses the use of certain water-soluble, ionic azidosilanes as coupling agents in the glass finishing industry. Marsden discloses coating a solid, such as glass, with the water-soluble, ionic azidosilane and allowing it to dry, followed by applying an organic polymer to the coated surface and curing the polymer at an elevated temperature. One disadvantage however of using a water-soluble azidosilane for this purpose is that the azidosilane, after reaction and incorporation between a solid and a polymer as a bonding agent, is hydrolyzable and the resulting bond is thus susceptible to attack by water.

A series of U. S. Pat. Nos. to J. Brent Thomson (3,697,551; 3,705,911; 3,706,592; 3,715,371; and 3,813,351) discloses certain nitrogen containing silane compounds and their uses in combination with various polymers and solvents as adhesion promoting agents and as priming compositions.

A series of U.S. Patents to James N. Haynes (U.S. Pat. Nos. 3,686,231; 3,814,657; 3,914,262; 3,946,051) discloses certain azidoformates and their use to improve the adhesion of polyester materials to other materials, for example epoxy adhesives. In accordance with the disclosures of Haynes, a solution of an azidoformate is applied to a surface of a solid polyester material, then dried and heated to evaporate the solvent and activate the azidoformate. The surface prepared in this manner is demonstrated to form bonds with conventional adhesives which are of increased strength.

U.S. Pat. No. 3,616,199 to Breslow also relates to improved adhesion to polyester materials. Breslow discloses the use of certain polysulfonyl azides to modify the surface of polyester materials, particularly tire cords, so that they will form stronger bonds to, for example, vulcanized rubber used to manufacture tires.

U.S. Pat. No. 4,099,910 to Herweh discloses the use of fluorinated azidoformates and sulfonyl azides for the purpose of treating fabrics to render them fire resistant. The compounds are applied in solution to a fabric, then heated to evaporate the solvent and activate the azide so as to bond the fluorinated compound to the fabric surface. U.S. Pat. No. 3,997,571 to Buckley also discloses the use of fluorinated azidoformates and fluorinated sulfonyl azides as textile-finishing agents. U.S. Pat. No. 4,309,453 to Reiner, et al., discloses a the use of certain monomeric azide or diazo compounds, having a hydrophilic, hydrophobic, oleophobic and/or ionic group present at the opposite end of the compound from the azide or diazo moiety, for the purpose of altering the surfaces of solid polymeric materials, for example for the purpose of increasing the susceptibility of the solid polymeric materials to printing or adhesion.

SUMMARY OF THE INVENTION (DISCLOSURE OF THE INVENTION)

In view of the foregoing, it is an object and purpose of the present invention to provide a method for improving the adhesion of adhesive compositions to metals.

It is a further objective of this invention to provide a process for treating a metal surface so as to improve the bonding of the surface to adhesive compositions.

It is another object and purpose of the present invention to provide a treated metal surface that can be thermally or photochemically activated upon exposure to an adhesive composition so as to increase the bond strength to the adhesive composition.

To attain the foregoing objects and purposes, and in accordance with the preferred embodiment of the present invention, a metal surface is first oxidized by exposure to a halogen, preferably a gaseous halogen, so as to form a thin layer of metal halide on the surface. The surface is then exposed to a solution of an azide, which results in ion exchange of the azide ions for the halide ions, and to thereby form a layer of azide on the surface of the metal. The azide can then be thermally or photochemically decomposed to form nitrenes, for example upon contact with an adhesive composition, such as an adhesive resin, primer, or paint. The nitrenes react with the metal and the immediately adjacent adhesive composition to form bonds between the metal and the adhesive composition, thereby substantially increasing the bond strength between the metal and the adhesive composition.

These and other aspects of the present invention will be more apparent upon consideration of the following detailed description of the invention.

DETAILED DESCRIPTION OF THE PREFERRED EMBODIMENTS OF THE INVENTION (BEST MODES FOR CARRYING OUT THE INVENTION)

Organic and inorganic azides (R-N$_3$, NaN$_3$, for example) undergo thermal decomposition (thermolysis) and photochemical decomposition (photolysis) to give nitrenes and nitrogen gas, according to the following reactions:

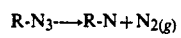

$$R\text{-}N_3 \longrightarrow R\text{-}N + N_{2(g)}$$

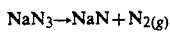

Thermal decomposition typically occurs at temperatures of between 90° and 180° Celsius. Photochemical decomposition is typically induced with ultraviolet light at wavelengths of approximately 300 nanometers.

The nitrene is a monovalent (singly bonded or a negatively charged ion) nitrogen species in which the normal second and third valences of the nitrogen atom are not satisfied. These unsatisfied valencies give rise to a wide variety of chemical reactions in an attempt by the nitrogen to complete its normal three valences.

The nitrene species are extremely reactive and add to a number of organic structures to form covalent bonds. In these reactions, the original bond between the nitrene and its substrate is preserved and two additional bonds are formed. This reaction sequence can provide a means by which distinct molecules are joined together through the nitrogen atom. The reactivity of the nitrene is so great the reaction occurs even by insertion in existing, strong bonds such as the carbon-hydrogen bond in aromatic rings (in a two step process through an addition to the aromatic ring followed by rearrangement). The nitrene can also form coordinate covalent bonds to such species as organic sulfides, organophosphines, and some organometallic species in an attempt to saturate the unsatisfied valencies. This extreme reactivity is utilized in the present invention to provide the covalent bonding process for adhesive and primer formulations and to allow derivatization of chemically inert metal surfaces.

Some examples of insertion or addition reactions of nitrene species are as follows:

Reaction 1: Insertion of nitrene into aliphatic double bonds.

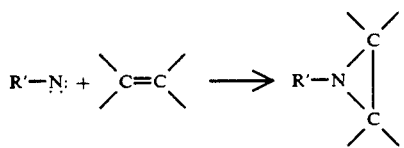

Reaction 2: Insertion of nitrene into activated carbon-hydrogen bonds.

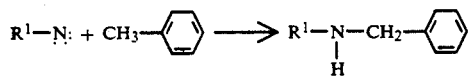

Reaction 3: Coupling of nitrene onto aromatic rings.

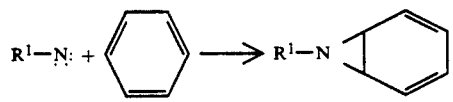

Reaction 4: Addition of nitrene onto sulfur.

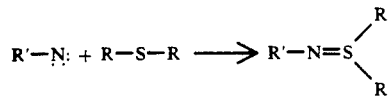

Reaction 5: Insertion of nitrene into carbonyls.

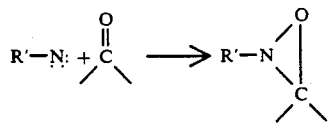

The azide functional group in organic systems and the azide ion in metal azide compounds decompose by thermal activation with a high exothermic energy of reaction. This high reaction energy gives rise to an abrupt onset of decomposition as the temperature is raised. For temperatures in excess of a threshold temperature, the reaction accelerates rapidly. At temperatures substantially below the threshold temperature the decomposition is very slow and the compound has a long useful life. The temperature at which the reaction accelerates rapidly and decomposition occurs is strongly influenced by the atoms or molecules to which the azide is attached. This thermal behavior is ideal for applications in which rapid reaction is desired, yet in which it is also desirable that the material have a long shelf life. This property of long shelf life has been a significant problem in adhesive formulation; some chemically reactive adhesive formulations must be stored under refrigeration. Furthermore, the sensitivity of the decomposition onset temperature to the structure of the organic azide allows the structure to be tailored to specific applications. The combination of properties demonstrated by organic and metallic azides makes using this functional group in adhesive or surface treatment formulations an ideal solution for general applicability.

In accordance with the present invention, the surface of a metal article is cleaned, for example by acid washing or other conventional techniques. The surface of the metal is then oxidized by exposure to a halogen, thereby forming a thin layer of metal halide on the surface. It is believed that this layer is essentially a monomolecular layer in many instances.

The halogen oxidation of the metal may preferably be attained by exposing the metal surface to gaseous chlorine, bromine or other molecular halogen. Alternatively, the surface may be exposed to the halogen dissolved in a solution of a suitable solvent, for example an aqueous solution of an alkali polyhalide. In both cases the surface of the metal is oxidized by the halogen to form a monolayer of halide ions on the surface. The halide ions are then exchanged for azide ions by exposure of the metal surface to a concentrated solution of an azide salt, for example sodium azide. Upon drying, the activated surface contains a monolayer of metal azide. The activated surface can then be exposed to a suitable resin and the azide monolayer thermally decomposed to bond the metal to the resin.

Metals which can be activated in this manner include, but are not limited to, copper, nickel, zinc, gold platinum, silver, iron, chromium, titanium, steels, brass, bronze, cobalt, vanadium, aluminum and aluminum alloys.

Metal surfaces to be activated in this manner are first cleaned and preferably etched, preferably in concentrated nitric acid. The etched surface is then rinsed and dried by evacuation. Halogen oxidation of the dry metal surface is then obtained by exposing the surface to flowing halogen vapor, preferably at a reduced pressure of approximately 250 millitorr, preferably for a period of approximately five minutes. Alternatively, oxidation with halogen in solution may be obtained with a solution of a complex polyhalide sodium salt (for example sodium triiodide).

Oxidation with the halogen results in the formation of what is believed to be a monolayer of ionically bound halide ions on the surface of the metal.

Exchange of halide for azide is preferably carried out in or coated with an azide.containing solution, such as a 0.1–2.0 molar aqueous solution of sodium azide (NaN$_3$) for a sufficient time (e.g., approximately thirty seconds to three minutes) to allow for the exchange, followed by washing of the surface (e.g., in electronic grade methanol) and subsequent air drying. The azide-containing solution can be a low viscosity solution so that the metal surface may be dipped into the solution, or a high-viscosity solution so that the azide-containing solution may be painted on or spread onto the metal surface.

The activated metal surface may then be contacted with a variety of adhesive compositions, such as thermosetting or thermoplastic resins. Upon contact with the adhesive composition, the azide layer may be decomposed by thermal or photochemical decomposition. The thermal decomposition temperatures (threshold temperatures) for the surface metal azides are generally in the range of 50° to 90° Celsius, somewhat lower than those of the organic azides. In the case of a thermoplastic adhesive, decomposition and reaction of the azide occurs on contact with the hot adhesive melt. In the case of thermosetting resins such as the epoxies, decomposition and reaction of the azide may take place upon exothermic setting of the adhesive; or upon curing at elevated temperatures; or may be thermally or photochemically induced in the case of resins which ordinarily set at room temperatures.

Interfacial bonding using inorganic azides is demonstrated by the following non-limiting example.

EXAMPLE

Metal Surface Azide Activation

Copper foil having a thickness of 125 micrometers was surface activated with a monolayer of azide ions and subsequently bonded to an epoxy-fiberglass strip with a conventional epoxy adhesive.

The azide ion monolayer was prepared by the following process.

The copper foil was cleaned and passivated by etching in 37.5 percent nitric acid for one minute. The etch passivated foil was placed in a gas handling system, which was then evacuated to remove atmospheric gases and surface moisture from the surface of the foil. Flowing gaseous chlorine was then introduced at a pressure of 250 milliTorr for five minutes, which was sufficient to oxidize the copper surface. The chlorine flow was stopped and the system was evacuated, then backfilled with air to 1 atmosphere, and the sample removed. This procedure resulted in the formation of a monolayer of solid copper chloride (CuCl$_2$) on the surface of the foil.

The chloride component of the monolayer on the oxidized surface was then exchanged for azide ion by immersion of the copper foil in a 0.1 molar aqueous solution of sodium azide (NaN$_3$) for approximately one minute, resulting in nearly quantitative exchange of the azide for the chloride ions. After the ion exchange, the foil was rinsed in electronic grade methanol and air dried, giving a dry copper foil having a surface activated with a monolayer of copper azide.

The foil surface thus activated with azide was then bonded to a strip of a solid epoxy/glass composite material, using an epoxy adhesive composition consisting of a mixture of 41 grams of SHELL EPON 826 (trademark) (a bisphenol-A diglycidyl ether) to 9 grams of JEFFAMINE T 403 (trademark) (a polyether amine). The adhesive composition was cured at approximately 100° C. for one hour.

Control copper foils were similarly prepared and bonded to the same epoxy/glass strips, using the same adhesive composition but without the prior establishment of the azide monolayer.

The foils adhered to the epoxy/glass composite strips in this manner were subjected to "T" peel tests, with the pre-treated foils being compared with control samples bonded with the same procedure, but without the surface azide. Samples not having the azide interfacial bond gave peel strengths of about 2 pli (pounds per linear inch) while samples activated with azide as described gave T peel strengths of 6–8 pli, an improvement of 300–400 percent in bond strength.

The present invention has wide industrial applicability in the application of adhesives, paints, coatings, primers, and other similar adhesive compositions to metals. It will be appreciated that the method of the invention may be used to obtain improved bonding to bulk adhesives and resins, for example the epoxies, butadiene rubbers, and the like. It will be further recognized that the present invention may be used, alternatively, to obtain improved bonding of metals to primers and bonding agents and the like, following which the coated metal can be further bonded to bulk adhesive compositions.

The present invention has been described in detail with particular reference to several preferred embodiments. Nevertheless, it will be understood that various modifications, alterations and substitutions may be apparent to one of ordinary skill in the art, and that such modifications, alterations, and substitutions may be made without departing from the essential invention. Accordingly, the scope of the present invention is defined by the following claims.

The embodiments of the invention in which patent protection is claimed are as follows:

1. A method of bonding an adhesive composition to a metal surface, comprising the steps of:
   a) oxidizing the metal surface with a halogen to form a layer of halide ions on the metal surface;
   b) exchanging the halide ions on the metal surface with azide ions by exposing the metal surface to a solution of an azide so as to form a layer of azide ions on the metal surface;
   c) contacting the metal surface having the layer of azide ions thereon with an adhesive composition; and
   d) causing the azide ions to decompose so as to form nitrenes which bond the metal surface to the adhesive composition.

2. The method of claim 1 wherein the metal surface is oxidized by exposing the metal surface to flowing halogen gas.

3. The method of claim 2 wherein the halogen gas is at a reduced pressure.

4. The method of claim 1 wherein the metal surface is oxidized by exposure of the metal surface to a solution of the halogen.

5. The method of claim 4 wherein the solution of the halogen comprises a solution of a polyhalide.

6. The method of claim 5 wherein the polyhalide comprises an alkali polyhalide.

7. The method of claim 1 wherein the solution of the azide comprises an azide salt solution.

8. The method of claim 7 wherein the azide salt solution comprises an aqueous solution of sodium azide.

9. The method of claim 8 wherein the halide ions are exchanged for azide ions by exposing the metal surface to a solution of between approximately 0.1 and 2.0 molar sodium azide for between approximately thirty seconds to three minutes.

10. The method of claim 1 wherein the azide ions are thermally decomposed.

11. The method of claim 10 wherein the metal substrate and adhesive composition are heated.

12. The method of claim 1 wherein the azide ions are photochemically decomposed.

13. The method of claim 12 wherein the azide ions are exposed to ultraviolet radiation.

14. The method of claim 1 wherein the adhesive composition comprises an adhesive.

15. The method of claim 14 wherein the adhesive comprises a thermoplastic adhesive.

16. The method of claim 14 wherein the adhesive comprises a thermosetting adhesive.

17. The method of claim 1 wherein the adhesive composition comprises a resin.

18. The method of claim 1 wherein the adhesive composition comprises a coating.

19. The method of claim 1 wherein the adhesive composition comprises a primer.

20. The method of claim 1 wherein the adhesive composition comprises a paint.

21. The method of claim 1 wherein the adhesive composition comprises a bonding agent.

22. The method of claim 1 wherein the adhesive composition comprises a coupling agent.

23. The method of claim 1 wherein the metal surface comprises a planar element.

24. The method of claim 1 wherein the metal surface comprises a fiber.

25. The method of claim 1 wherein the metal surface comprises a wire.

26. The method of claim 1 wherein the metal surface comprises a foil.

27. The method of claim 1 wherein the metal surface comprises a microsphere.

28. The method of claim 1 wherein the metal surface comprises a particle.

29. The method of claim 1 wherein the metal surface comprises a powder.

* * * * *